United States Patent
Nekado

(10) Patent No.: US 6,373,239 B1
(45) Date of Patent: Apr. 16, 2002

(54) POSITION DETECTING APPARATUS UTILIZING A MAGNETIC SCALE AND SENSOR

(75) Inventor: Yasuo Nekado, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 09/630,880

(22) Filed: Aug. 2, 2000

(30) Foreign Application Priority Data

Aug. 2, 1999 (JP) .......................................... 11-219015

(51) Int. Cl.$^7$ ................................................ G01B 7/14
(52) U.S. Cl. .............................. 324/207.15; 324/207.24
(58) Field of Search ........................ 324/207.2, 207.21, 324/207.22, 207.24, 207.25, 207.15, 207.16, 207.19; 338/32 R, 32 M

(56) References Cited

U.S. PATENT DOCUMENTS 5,565,769 A * 10/1996 Mehnert et al. ......... 324/207.2
6,211,668 B1 * 4/2001 Duesler et al. .......... 324/207.2

* cited by examiner

Primary Examiner—Jay Patidar
Assistant Examiner—Subhash A Zaveri
(74) Attorney, Agent, or Firm—Jay H. Maioli

(57) ABSTRACT

A position detecting apparatus including a magnetic scale and a magnetic sensor for detecting a magnetic field generated by the magnetic sensor. The magnetic field extending in a magnetism-sensing direction perpendicular to a first direction in which the magnetic sensor moves relative to the magnetic scale and a second direction in which the magnetic sensor is spaced from the magnetic scale. The positional relationship between the magnetic scale and the magnetic sensor is detected from the magnetic field detected by the magnetic sensor in the magnetism-sensing direction.

4 Claims, 10 Drawing Sheets

POSITION DETECTING APPARATUS UTILIZING A MAGNETIC SCALE AND SENSOR

BACKGROUND OF THE INVENTION

The present invention relates to a position detecting apparatus for detecting the distance and position for and to which a movable component of a machine tool or industrial robot has moved.

A position detecting apparatus is known, which detects the distance and position for and to which a movable component of a machine tool or industrial robot has moved.

A position detecting apparatus of this type has been proposed in Japanese Patent Application No. 9-81016 filed by the present applicant.

FIG. 1 shows the position detecting apparatus proposed in Japanese Patent Application No. 9-81016.

As shown in FIG. 1, the position detecting apparatus 100 comprises a scale 101 and a magnetic sensor 102. The scale 101 is a magnetic member. The magnetic sensor 102 detects the magnetic field generated by the scale 101.

The scale 101 is a magnet that is made of, for example, ferrite-based plastic. It is shaped like a plate having a major surface 103. The major surface 103 is a length $L_{11}$ and a width $W_{10}$. The scale 101 has magnetized surfaces 103a and 103b. These surfaces 103a and 103b have been magnetized in opposite polarities, in a direction perpendicular to the major surface 103. As shown in FIG. 2, the magnetized surfaces 103a and 103b are separated by a boundary line m, which intersects with the longitudinal center line of the major surface 103, the center o of the major surface 103. (Hereinafter, the line m shall be referred to as "center line n." The center line n and the boundary line m intersect with each other at an angle θ.

The magnetic sensor 102 comprises an annular core 104 and coils 105 and 106. The core 104 is shaped like a rectangular frame, defining a closed magnetic path. The coils 104 and 105 are wound around the opposing longer sides of the core 104, respectively. The core 104 is made of high-permeability material such as permalloy or amorphous metal. The coils 105 and 106 have 50 turns each. Each coil is formed by winding a Cu wire having a diameter of 0.06 mm around one longer side of the core 104. A high-frequency pulse current is made to flow in the coils 105 and 106, which generate magnetic fields in the opposite directions.

The scale 101 and the magnetic sensor 102, thus constructed, are spaced apart by a predetermined distance. They are arranged such that the coils 105 and 106 have their axes perpendicular to the major surface 103 of the scale 101 and set aside in the widthwise direction of the major surface 103 and that the midpoint between the axes of the coils 105 and 106 is located exactly above the center line n of the major surface 102.

The scale 101 and the magnetic sensor 102, thus arranged, are secured to a fixed component and movable component of a machine tool, respectively. The scale 101 and the sensor 102 may move along the center line n of the major surface 103 of the scale 101. At any position in the lengthwise direction of the scale 101, the magnetic sensor 102 detects a magnetic field emanating from the scale 101.

The operating principle of the position detecting apparatus 100 will be described, on the assumption that the lengthwise direction and widthwise direction of the major surface 103 are X direction and Y direction, respectively, and that the direction perpendicular to the major surface 103 is Z direction.

FIG. 3 shows a cross section of the scale 101, taken along a line passing the intersection o of the centerline n of the scale 101 and the boundary line in, or the center o of the major surface 103. As shown in FIG. 4, the magnetic field extending in the Z direction linearly changes in Y direction, from value $-W_{10}/4$ to value $W_{10}/4$. It follows that the magnetic field extending in the Z direction represents the position in the Y direction of the scale 101.

The scale 101 is designed so that its detection-effective length $L_{12}$, measured lengthwise (in the X direction), is shorter than the length $L_{11}$ (that is, $L_{12}<L_{11}$) and the angle θ, at which the lines n and m intersect with each other, is tan$^{-1}(d/L_{12})$ (d is equal to or less than $W_{10}/2$). The magnetic sensor 102 is moved along the center line n in the X direction, within the range of the detection-effective length $L_{12}$. The two coils 105 and 106 respectively detect the magnetic fields that emanate from the surfaces 103 a and 103b magnetized in the opposite polarities and which extends in the Z direction. The difference between the outputs of the coils 105 and 106 linearly changes according to their positions along the longitudinal direction of the scale 101, in the same way as the magnetic field extending in the Z direction changes in the Y direction in the cross section of the scale 101, which is taken along a line passing the intersection o of the lines n and m. That is, the vertical magnetic field, which the magnetic sensor 102 detects, changes in accordance with the distance between the scale 101 and the magnetic sensor 102. This means that the positional relation between the scale 101 and the sensor 102 can be detected from the intensity of the vertical magnetic field the magnetic sensor 102 has detected.

The magnetic field generated by the scale 101 linearly changes, but for an extremely narrow range. The detection precision of the position detecting apparatus 100 described above is greatly influenced by a displacement, if any, of the scale 101 or the magnetic sensor 102. It is difficult for the apparatus 100 to detect the positions of the scale 101 and sensor 102 with a high accuracy. It is also difficult to position the scale 101 and the sensor 102 in the process of securing them to the components of a machine tool. Inevitably, the outputs of the coils 103a and 103b differ from the desired values. The detection precision of the apparatus 100 greatly decreases when the magnetic sensor 102 is positioned outside the region in which a magnetic field changes linearly.

The magnetic sensor 102 is a coil sensor. Its dimension is the largest in the coil-winding direction, i.e., magnetism-detecting direction. In the position detecting apparatus 100, the magnetic sensor 102 detects the magnetic field that extends in the direction perpendicular to the major surface 103 of the scale 101. The magnetic sensor 102 must therefore be arranged so that the magnetism-detecting direction may be perpendicular to the major surface 103 of the scale 101. Consequently, the apparatus 100 is large and massive.

BRIEF SUMMARY OF THE INVENTION

The present invention has been made in consideration of the foregoing. The object of the invention is to provide a position detecting apparatus that is small and exhibits output characteristic little influenced by a positioning error, vibration, or displacement.

To achieve the object, a position detecting apparatus according to this invention comprises: magnetic field generating means for generating a magnetic field; and magnetic field detecting means capable of moving relative to the magnetic field detecting means, for detecting the magnetic field generated by the magnetic field detecting means. The magnetic field extends at right angles to a direction in which the magnetic field detecting means moves relative to the magnetic field generating means and extends to a magnetism-sensing direction in which the magnetic field detecting means is spaced from the magnetic field generating means. The magnetic field generating means applies to the magnetic field detecting means a magnetic field whose intensity linearly changes over a prescribed distance (L2) in the direction in which the magnetic field detecting means moves relative to the magnetic field generating means. The positional relation between the magnetic field generating means and the magnetic field detecting means is detected from the magnetic field detected by the magnetic field detecting means.

In the position detecting apparatus, the magnetic field generated by the magnetic field generating means extends at right angles to the direction in which the magnetic field detecting means moves relative to the magnetic field generating means. The intensity of this magnetic field linearly changes in the direction in which the magnetic field detecting means moves relative to the magnetic field generating means. The magnetic field detecting means detects the magnetic field that changes in intensity in accordance with the positional relation between the magnetic field generating means and the magnetic field detecting means. The positional relation is determined from the magnetic field detected by the magnetic field detecting means.

As mentioned above, the magnetic field generating means generates a magnetic field that extends at right angles to the direction in which the magnetic field detecting means moves relative to the magnetic field generating means. The intensity of the magnetic field linearly changes in the direction in which the magnetic field detecting means moves relative to the magnetic field generating means. The magnetic field detecting means detects this magnetic field, from which the positional relation is determined.

The position detecting apparatus according to the invention has output characteristic that is little influenced by a positioning error, vibration, or displacement. Moreover, the position detecting apparatus can be small.

DETAILED DESCRIPTION OF THE INVENTION

Embodiments of the present invention will be described, with reference to the accompanying drawings.

Figure 5:
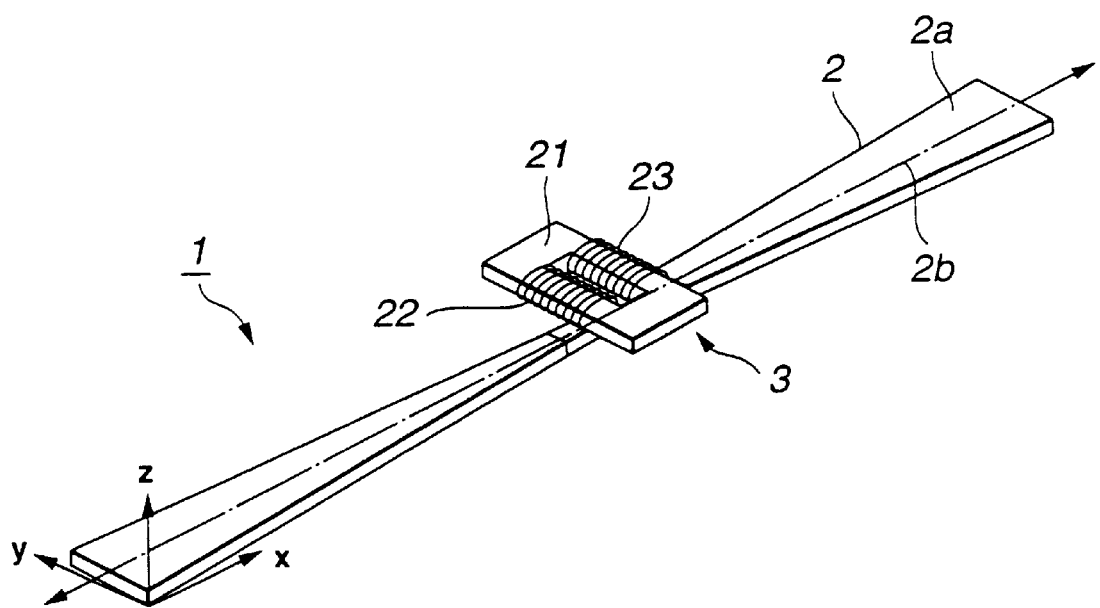
FIG. 5 is a schematic perspective view of a position detecting apparatus according to the present invention.

FIG. 5 shows a position detecting apparatus 1 according to this invention.

As shown in FIG. 5, the position detecting apparatus 1 comprises a scale 2 and a magnetic sensor 3. The scale 2 generates a magnetic field, which serves as a position signal. The magnetic sensor 3 detects the magnetic field the scale 2 has generated. The position detecting apparatus 1 is designed to detect the positions that two movable components of, for example, a machine tool assume relative to each other.

The scale 2 is a combination of first to fourth magnetic members 4 to 7, which are magnets made of, for example, ferrite-based plastic. The magnetic members 4 to 7 are plates, each having a trapezoidal major surface. They are identical in shape. Each of the magnetic members 4 to 7 is magnetized in a direction perpendicular to the main surface. The material of the scale 2 is not limited to ferrite-based plastic. The magnetic members 4 to 7 may be SmCo-based magnets, NdFeB-based magnets, sintered magnets, or magnets made of an alloy such as FeMn or AlNiCo.

Figure 6:
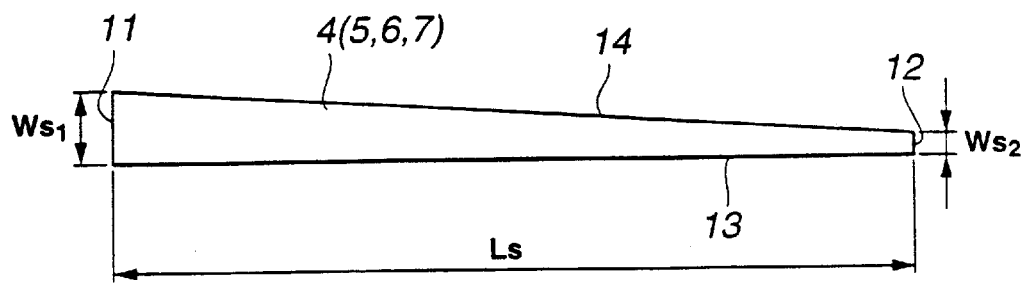
FIG. 6 is a diagram depicting the magnetic member constituting the scale of the position detecting apparatus shown in FIG. 5.
Figure 7:
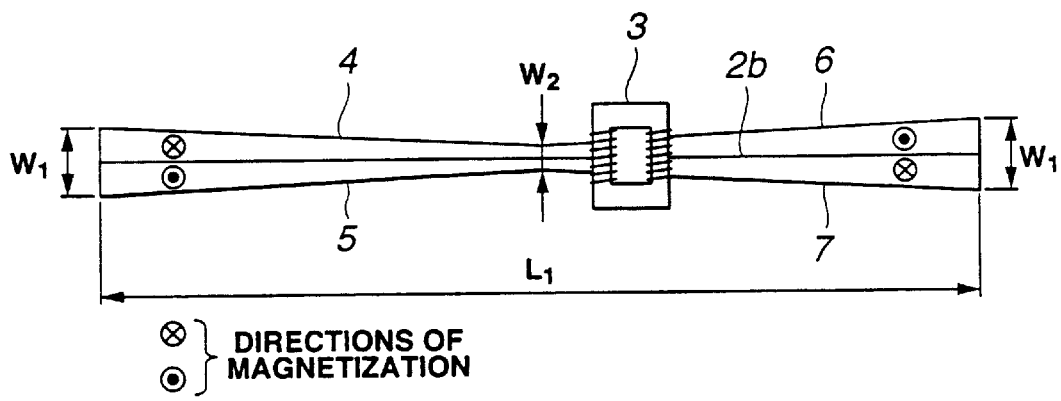
FIG. 7 is a diagram showing the scale comprising the magnetic member.

As shown in FIG. 6, four sides 11 to 14 define the trapezoidal major surface of each magnetic member. The first side 11 and the second side 12 are parallel to each other. The third side 13 intersects with the first and second sides 11 and 12 at right angles. The fourth side 14 intersects with the first side 11 at an acute angle. The first side 11 has length $W_{S1}$, the second side 12 has length $W_{S2}$, and the third side 13 has length $L_S$. The first side 11 is longer than the second side 12. (Namely, $W_{S1} > W_{S2}$.)

The magnetic members 4 to 7 are combined, forming the scale 2.

The first member 4 and the second member 5 are magnetized in the opposite polarities and have their major surfaces extending parallel to each other. They are arranged such that their third sides 13 abut on each other. The third member 6 is magnetized in the opposite polarity with respect to the first member 4 and is arranged with its major surface extending parallel to that of the first member 4 and with its second side 12 abutting on the second side of the first member 4. The fourth member 7 is magnetized in the same polarity as the first member 4 and is arranged with its major surface extending parallel to that of the first member 4 and with its third side 13 abutting on the third side of the third member 6. Thus, the second side 12 of the fourth member 7 abuts on the second side 12 of the second member 5.

The scale 2, thus assembled, is an elongated thin plate as a whole, with the third side 13 much longer than the first side 11 and second side 12. The scale 2 extends in a direction that is parallel to the third side 13. This direction will be referred to as "lengthwise direction of the scale 2."

The direction that is perpendicular to the lengthwise direction of the scale 2, i.e., the direction parallel to the first and second sides 11 and 12, will be referred to as "widthwise direction of the scale 2." The scale 2 has a width $W_1$ (=$2 \times W_{S1}$) at either end (defined by the first side 11) and a width $W_2$ (=$2 \times W_{S2}$) at the middle part (defined by the second side 12). The scale 2, thus assembled, has a length L1, which is twice the length LS of the third side 13 of the magnetic members 4 to 7.

Either end part of the scale 2 has a specific width, which shall be called "end-part width. The middle part of the scale 2 has a predetermined width, which shall be called "middle-part width." The major surface of the plate-shaped scale 2 formed by combining the magnetic members 4 to 7 shall be referred to as "scale major surface 2a." The axis of the scale major surface 2a, which is defined by the third sides of the members 4 to 7, shall be called "scale axis" hereinafter.

Figure 8:
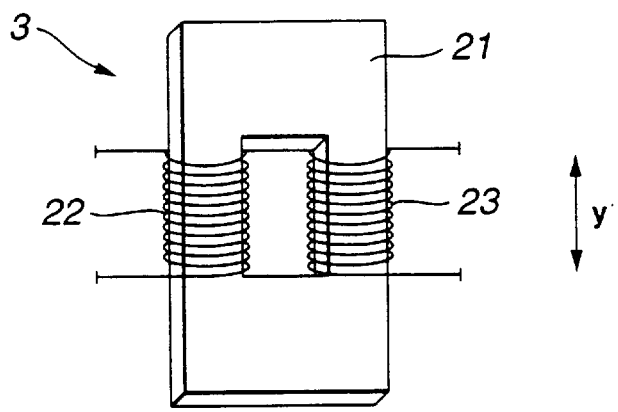
FIG. 8 is a diagram illustrating the magnetic sensor incorporated in the position detecting apparatus.

As shown in FIG. 8, the magnetic sensor 3 comprises an annular core 21 and coils 22 and 23. The core 21 is shaped like a rectangular frame, defining a closed magnetic path. The coils 22 and 23 are wound around the opposing longer sides of the core 21, respectively. The core 21 is made of high-permeability material such as permalloy or amorphous metal. The amorphous metal is made mainly of Fe, Co, Si, B or the like. Each coil is cylindrical, formed by winding a Cu wire around one longer side of the core 21. The coils 22 and 23 are arranged, with their axes extending parallel to each other. A high-frequency pulse current, for example, is made to flow in the coils 22 and 23, which generate magnetic fields in the opposite directions.

The magnetic sensor 3 described above is very sensitive to a magnetic field extending parallel to the axes of the coils 22 and 23. The impedance of the magnetic sensor 3 changes very much in accordance with the magnetic field extending to the axes of the coils 22 and 23. The direction parallel to the axes of the coils 22 and 23, i.e., the y direction shown in FIG. 8, shall be referred to as "magnetism-sensing direction" of the magnetic sensor 3.

The coils 22 and 23 are driven in the opposite phases. This is because the output of the magnetic sensor 3 (i.e., the difference between the outputs of the coils 22 and 23) is large when magnetic fields of the same phase are applied to the coils 22 and 23 and is canceled when signals of the same phase, such as electrical noises, are supplied to the coils 22 and 23. The sensor 3 can, therefore, generate a stable output that is large and stable. The magnetic sensor 3 is not limited to one having two coils. Rather, it may have one coil. Moreover, the coils may be replaced by a magnetic impedance element or any other magnetism-detecting means.

Signal lines connect the coils 22 and 23 of the magnetic sensor 3 to a drive/detection circuit. The drive/detection circuit supplies an excitation current to the coils 22 and 23 and detects the outputs of the coils 22 and 23.

The drive/detection circuit, which drives the coils 22 and 23 and detects the outputs thereof, will be described with reference to FIG. 9.

Figure 9:
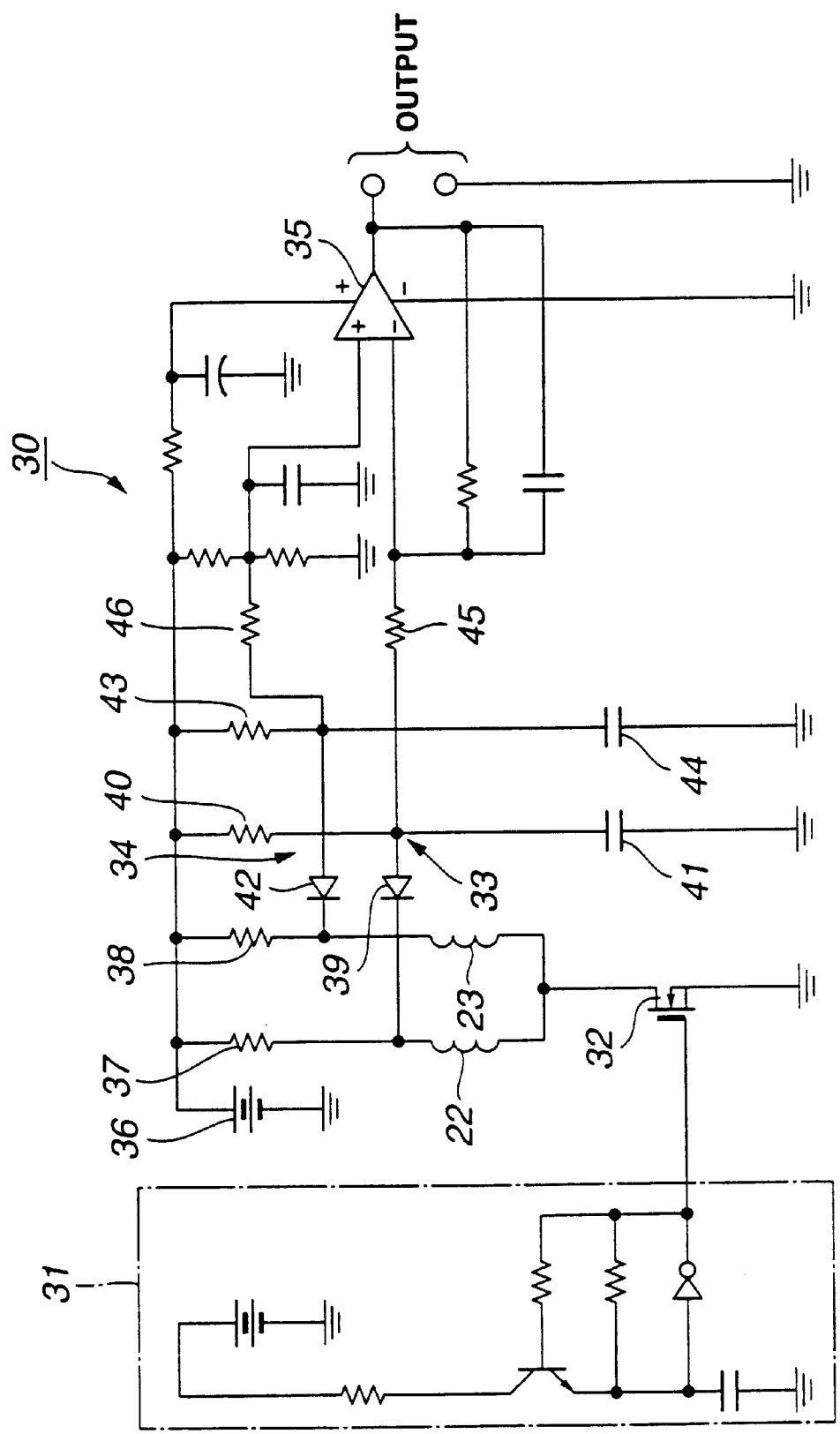
FIG. 9 is a circuit diagram of the magnetic sensor.

As shown in FIG. 9, the drive/detection circuit 30 comprises an oscillator circuit 31, a switching circuit 32, a first smoothing circuit 33, a second smoothing circuit 34, and a differential amplifier circuit 35. The oscillator circuit 31 generates a pulse signal. The switching circuit 32 switches the excitation currents flowing in the coil 22 or the coil 23, in accordance with the pulse signal the oscillator circuit 31 has generated. The first smoothing circuit 33 detects and smoothens the output voltage of the coil 22. The second smoothing circuit 34 detects and smoothens the output voltage of the coil 23. The differential amplifier circuit 35 detects the difference between the output voltages of the first and second smoothing circuits 33 and 34, thereby generating a differential signal.

The oscillator circuit 31 outputs a pulse signal having a prescribed high frequency. The switching circuit 32 switches the currents flowing in the coils 22 and 23 that are connected in series, in accordance with the high-frequency pulse signal. The coils 22 and 23 are thereby excited with a high-frequency current.

The coil 22 is connected at one end to a bridge resistor 37, which in turn is connected to a power supply 36. The coil 22 is connected at the other end to the switching circuit 32. The coil 23 is connected at one end to a bridge resistor 38, which in turn is connected to the power supply 36. The coil 23 is connected at the other end to the switching circuit 32. When switched by the switching circuit 32, the coils 22 and 23 are excited with a high-frequency signal and generate magnetic fields which are opposite in phase.

The first smoothing circuit 33 comprises a diode 39, a resistor 40, and a capacitor 41. The diode 39 has its cathode connected to the junction of the coil 22 and the bridge resistor 37. The resistor 40 is connected at one end to the power supply 36 and at the other end to the anode of the diode 39. The capacitor 41 is connected at one end to the ground and at the other end to the anode of the diode 39. The first smoothing circuit 33 smoothens the voltage the coil 22 generates when it is excited with the high-frequency signal.

The second smoothing circuit 34 comprises a diode 42, a resistor 43, and a capacitor 44. The diode 42 has its cathode connected to the junction of the coil 23 and the bridge resistor 38. The resistor 43 is connected at one end to the power supply 36 and at the other end to the anode of the diode 42. The capacitor 44 is connected at one end to the ground and at the other end to the anode of the diode 42. The second smoothing circuit 34 smoothens the voltage the coil 23 generates when it is excited with the high-frequency signal.

The differential amplifier circuit 35 has an inverting input terminal and a non-inverting input terminal. The inverting input terminal is connected to a resistor 45, which is connected to anode of the diode 39 provided in the first smoothing circuit 33. The non-inverting input terminal is connected to a resistor 46, which is connected to the anode of the diode 42 incorporated in the second smoothing circuit 34. The circuit 35 amplifies the difference between the voltage generated in the coil 22 and smoothed by the first smoothing circuit 33 and the voltage generated in the coil 23 and smoothed by the second smoothing circuit 34.

In the /detection circuit 30 thus constructed, the high-frequency pulse signal output from the oscillator circuit 31 excites the coils 22 and 23 in the opposite phases. The coils 22 and 23, which are excited in the opposite phases, each generates a bias voltage, when magnetic fields extending in the same direction are applied to the coils 22 and 23. The bias voltages generated by the coils 22 and 23 differ in polarity, because the coils 22 and 23 are driven in the opposite phases. Hence, the drive/detection circuit 30 can detect the difference between the bias voltages of the opposite polarities, which the coils 22 and 23 have generated, thereby detecting the intensities of the magnetic fields.

In the drive/detection circuit 30, a high-frequency pulse signal drives the coils 22 and 23. Nonetheless, the coils 22 and 23 may be driven by, for example, a sinusoidal signal. A pulse signal is preferable, because it contains a harmonic component and can efficiently drive the coils 22 and 23. Further, the use of a pulse signal serves to reduce the power consumption in the drive/detection circuit 30 because it can be adjusted in terms of duty ratio. Still further, a pulse signal, which contains a DC component, can change the impedance of the magnetic sensor 3. It should be noted that the oscillator circuit 31 is not limited to the one shown in FIG. 9. Rather, the circuit 31 may be replaced by one that has a quartz oscillator utilizing LC resonance, or one of any other type. Furthermore, the first smoothing circuit 33, the second smoothing circuit 34 and the differential amplifier circuit 35 may have any structures other than those illustrated in FIG. 9.

The magnetic sensor 3 is magnetized in a direction (i.e., the axes of the cylindrical coils 22 and 23) that is parallel to the major surface 2a of the scale 2. The sensor 3 is spaced apart from the major surface 2a by a prescribed distance. The direction in which the sensor 3 is magnetized intersects with the scale 2 (i.e., the axis 2b of the scale 2) at right angles. The magnetic sensor 3 is arranged with respect to the scale 2, with its center located exactly above the axis 2b of the scale 2.

The magnetic sensor 3 is secured to a moving component of, for example, a machine tool. Thus, the sensor 3 linearly moves along the axis 2b of the scale 2 as that component of the machine tool moves.

The position detecting apparatus 1 described above detects the positional relation of two moving components as will be described below, since the scale 2 and the magnetic sensor 3 move relative to each other.

The magnetic sensor 3 is magnetized in a direction that is perpendicular not only to the axis of the scale 2 but also to the major surface 2a thereof (i.e., the Z direction shown in FIG. 5). In addition, the sensor 3 is located exactly above the axis 2b of the scale 2 and is spaced apart from the major surface 2a by the prescribed distance. Further, the sensor 3 linearly moves along the axis 2b of the scale 2, while detecting magnetic fields at various positions on the axis 2b.

As described above, the width of the major surface 2a of the scale 2 gradually increases, from the middle part to either end. The scale 2 is magnetized in a direction perpendicular to the major surface 2a. Moreover, the halves of the scale 2, divided by the axis 2b, are magnetized in the opposite polarities.

Therefore, the scale 2 applies a magnetic field that extends parallel to the major surface 2a and perpendicular to the axis 2b, at the position which is at the prescribed distance from the major surface 2a and at which the sensor 3 detects the magnetic field. In other words, the scale 2 applies a magnetic field that extends in the Y direction shown in FIG. 5.

Figure 10A:
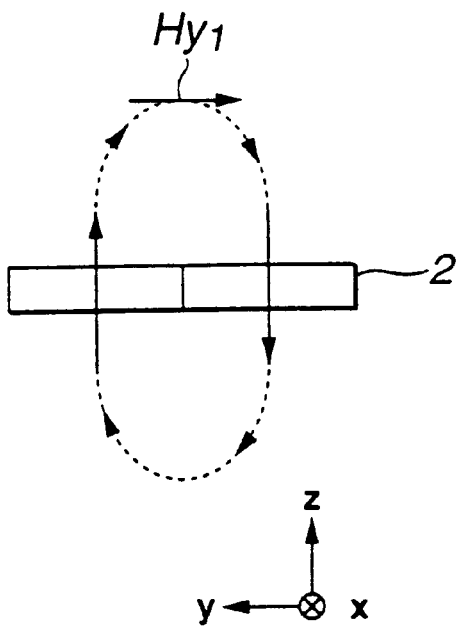
FIG. 10A is a diagram explaining the magnetic field detected near the center part of the magnetic sensor.
Figure 10B:
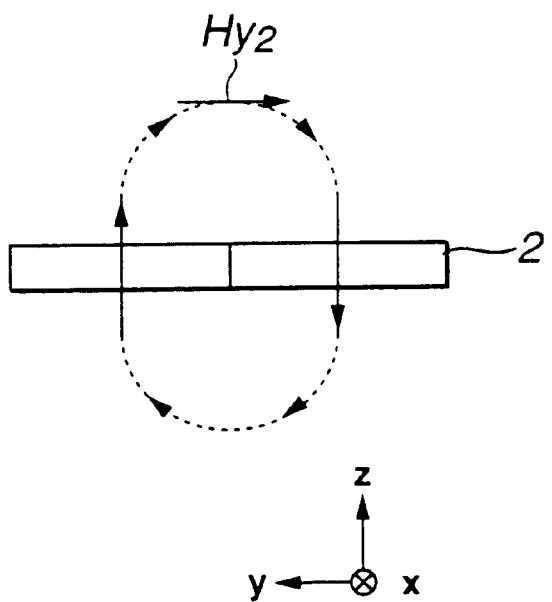
FIG. 10B is a diagram explaining the magnetic field detected near an end of the magnetic sensor.

The major surface 2a of the scale 2 have different widths at different points on the axis of the scale 2. Thus, the magnetic field has different intensities at the points on the axis of the scale 2. The major surface 2a has the smallest width $W_2$ at the middle part of the scale 2 and the largest width $W_1$ at either end. Namely, it gradually broadens, from the middle part of the scale 2 toward either end thereof. The magnetic field therefore linearly changes in the lengthwise direction of the scale 2. Assume a magnetic field $H_{Y1}$ extending in the Y direction is applied at a position near the middle part of the scale 2 as is shown in FIG. 10(A). Then, a more intense magnetic field $H_{Y2}$ is applied at a point near either end of the scale 2 as is illustrated in FIG. 10(B).

Further, the left and right halves of the scale 2, divided at the middle part, i.e., the narrowest part, are magnetized in the opposite polarities. Hence, the magnetic field has no intensity (zero intensity) at the middle part of the scale 2, has intensity of one polarity at the left half of the scale 2, and has intensity of the other polarity at the right half of the scale 2. Thus, two magnetic fields of the opposite polarities are applied to the ends of the scale 2.

In the position detecting apparatus 1, the magnetic sensor 3 detects magnetic fields of different intensities at various points on the axis 2b of the scale 2 as it moves relative to the scale 2. Thus, the position detecting apparatus 1 can detect the positional relation between the scale 2 and the magnetic sensor 3.

Figure 1:
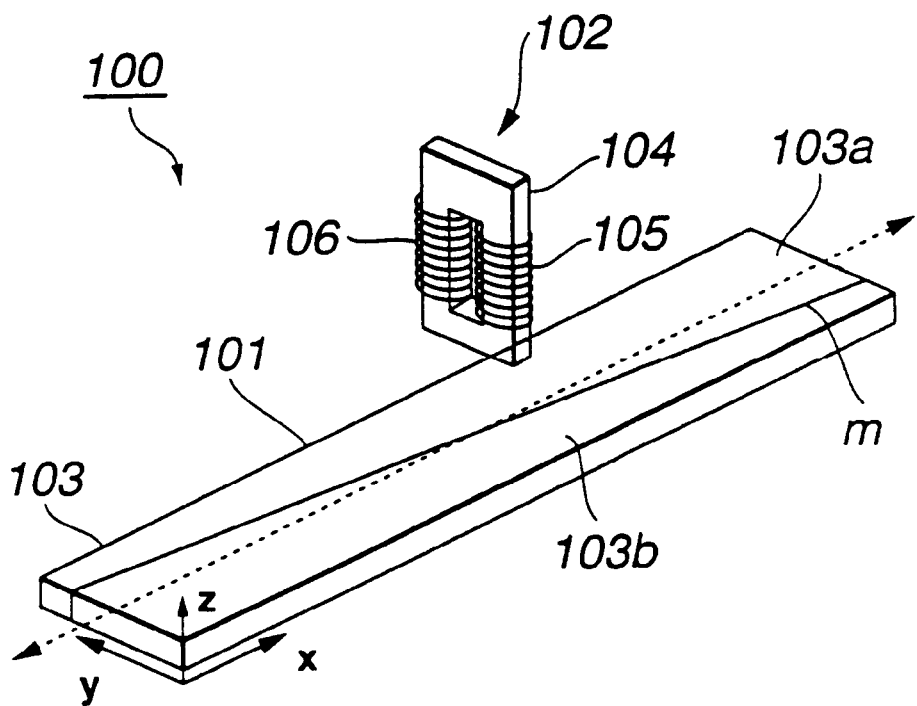
FIG. 1 is a schematic perspective view of a conventional position detecting apparatus.
Figure 2:
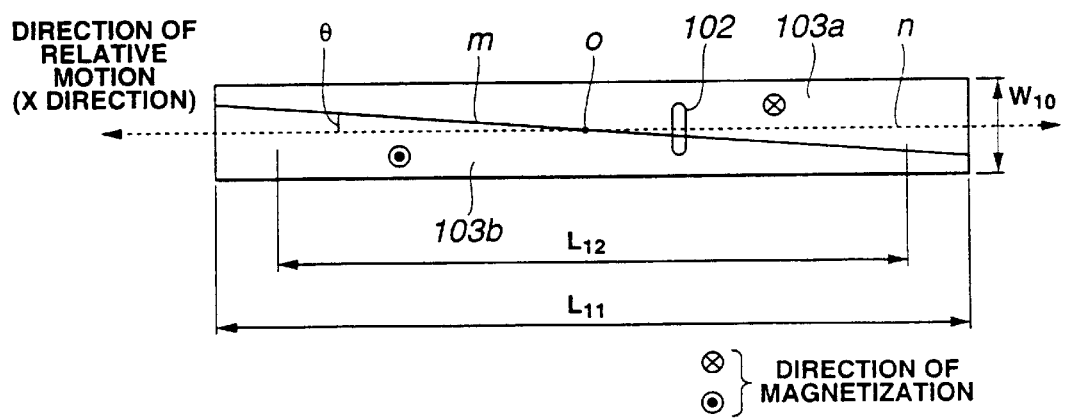
FIG. 2 is a diagram showing the scale incorporated in the conventional position detecting apparatus.
Figure 3:
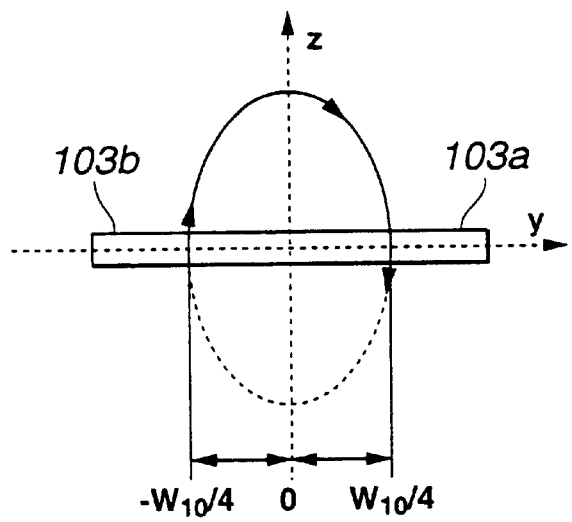
FIG. 3 is a diagram illustrating the direction in which the magnetic field emanating in Z direction from the scale.
Figure 4:
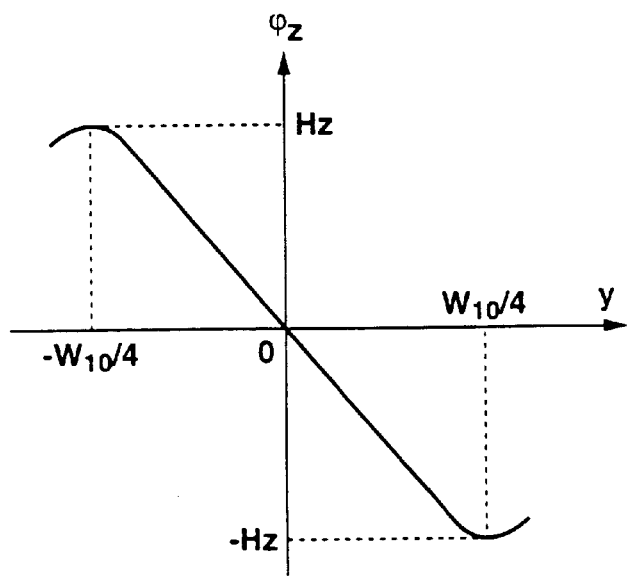
FIG. 4 is a graph showing how the magnetic field changes in the middle part of the scale in the widthwise direction thereof.

The magnetic sensor 3 extends, intersecting at right angles with the axis of the scale 2 (i.e., the direction in which the sensor 3 moves relative to the scale 2). The sensor 3 therefore detects a magnetic field that extends at right angles to the major surface 2a of the scale 2 (namely, a magnetic field extending in the Z direction in FIG. 5). That is, the two coils detect two magnetic fields extending in the same direction and parallel to the major surface 2a of the scale 2, not two magnetic fields extending in the opposite direction and perpendicular to the scale as in the conventional position detecting apparatus shown in FIG. 1. Hence, the detection accuracy of the apparatus 1 is not much affected even if the scale 2 and the sensor 3 are displaced with respect to each other due to, for example, the vibration of the apparatus 1. The apparatus 1 can thus detect, with high accuracy, the positions of the components to which the scale 2 and the sensor 3 are secured. Further, in the conventional position detecting apparatus, the regions in which the intensities of the magnetic fields linearly change are extremely narrow for a similar reason, and the detection accuracy becomes extremely low if the magnetic sensor is arranged outside those regions. According to the position detecting apparatus 1, however, the regions in which the intensities of the magnetic fields linearly change are broad enough to detect the positions with high accuracy without producing wide variations in detection accuracy. Moreover, the position detecting apparatus 1 can be small, for the magnetism-sensing direction of the coils 22 and 23 is parallel to the major surface 2a of the scale 2.

In designing the position detecting apparatus 1, the scale 2 may have a length $L_1$ that is much longer than the detection-effective length $L_2$ (i.e., the distance over which the apparatus 1 can function accurately). If so, the detection accuracy of the apparatus 1 will increase. This is because the intensity-change linearity of any magnetic field emanating from the scale 2 is poor at either near-end part of the scale 2, and this magnetic field must not be used to detect the positional relation between the scale 2 and the magnetic sensor 3.

Also, in designing the apparatus 1, it is desired that the middle part of the scale 2 have a width $W_2$ that is large enough to make the intensity of any magnetic field change linearly along the axis of the scale 2, from the middle part of the scale 2 to either end thereof. Should the width $W_2$ be nil (0) (that is, if the first to fourth magnetic members 4 to 7 each have a right-triangle major surface), the magnetic field would change less at the middle part of the scale 2 than at any other part thereof. In other words, the magnetic field would not change linearly. If the difference between the width $W_2$ and the width $W_1$ at either end of the scale 2 is small, the magnetic field would change more at the middle part of the scale 2 than any other part. In this case, too, the magnetic field will no not change linearly. In view of this, both the width $W_1$ and the width $W_2$ must have appropriate values so that the magnetic field may linearly change in intensity, enabling the apparatus 1 to detect positions with a higher accuracy.

The scale 2 used in the position detecting apparatus 1 is not limited to the one described above. Rather, a scale of any other type may be used, so long as it applies to the magnetic sensor 3 a magnetic field which extends in the magnetism-sensing direction of the sensor 3 and whose intensity linearly changes for a prescribed distance in the lengthwise direction of the scale 2.

Figure 11:
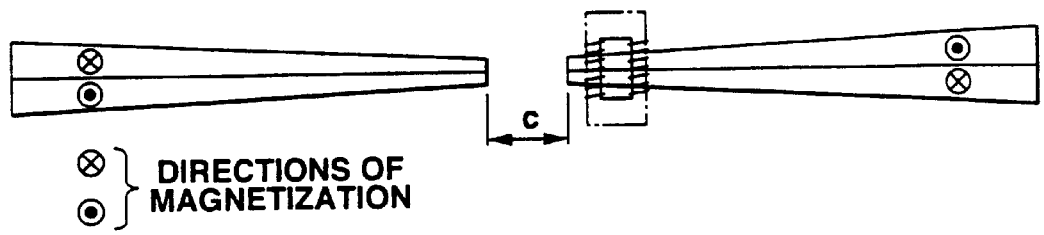
FIG. 11 is a diagram showing a modification of the sale, which has a gap at the center part.

For instance, a scale 2 may be of the type shown in FIG. 11. This scale is characterized in that the magnetic members 4 to 7 do not abut on one another at their sides 12, whereby a gap c is provided at the middle.

In designing the scale 2, the width $W_2$ of the middle part may be reduced in order to render the apparatus 1 small. If the width $W_2$ is reduced, however, the scale 2 will become less strong or will have a size different from the design size. Therefore, the width $W_2$ should not be reduced. Instead, the gap c is provided at the middle part of the scale 2 so that the intensity changes of the magnetic field may be adjusted over the scale 2.

Figure 12:
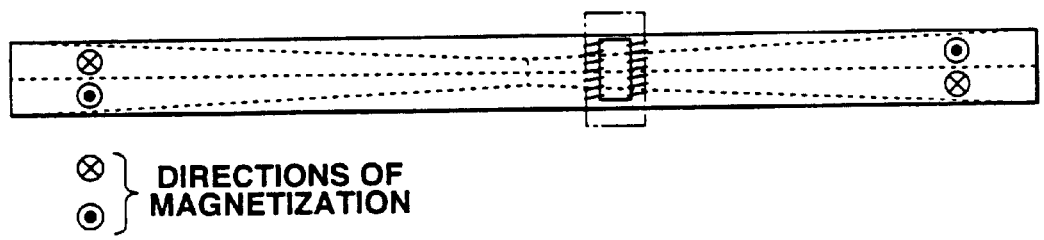
FIG. 12 is a diagram depicting another modification of the scale, which has a rectangular major surface.

The position detecting apparatus 1 may have a scale shown in FIG. 12, in place of the scale 2 described above. As shown in FIG. 12, the scale comprises a magnetic member that is a plate having a rectangular major surface. This scale has been magnetized in the same direction as the scale 2 described above. The scale shown in FIG. 12 is advantageous over the scale 2 in two respects. First, it can be assembled in fewer steps. Secondly, its size and shape may less deviate from the design size and shape.

Figure 13:
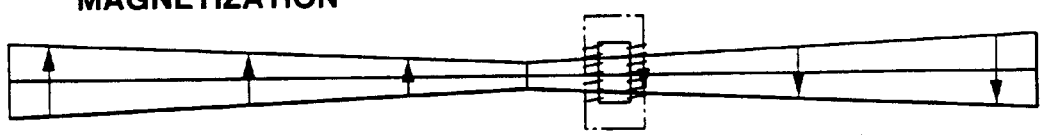
FIG. 13 is a diagram showing still another modification of the scale, which is magnetized in the direction parallel to the major surface.
Figure 14:
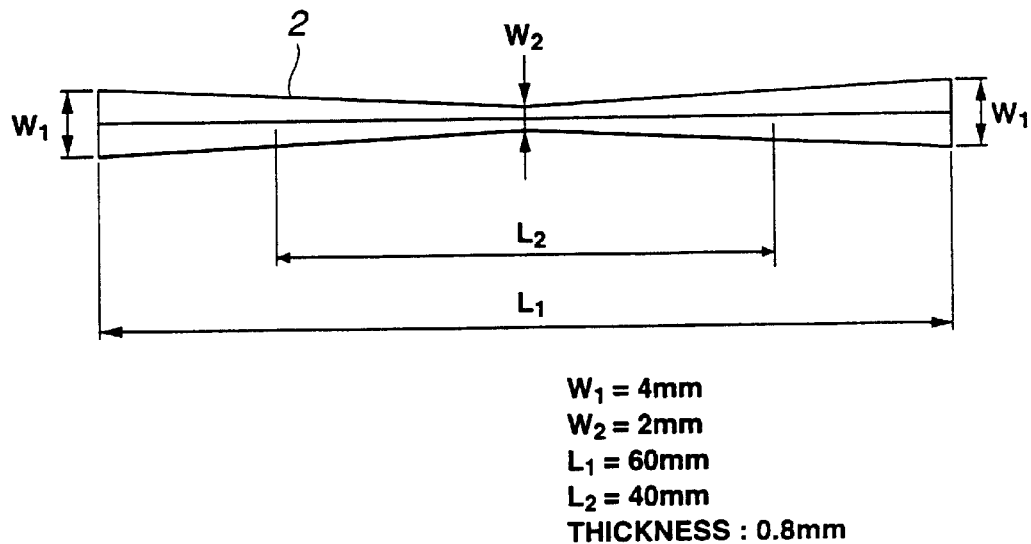
FIG. 14 is a diagram specifying the design particulars of the scale provided in the position detecting apparatus.

Further, the position detecting apparatus 1 may have a scale shown in FIG. 13, in place of the scale 2 described above. As shown in FIG. 13, the scale comprises four magnetic members, like the scale 2. It has the same shape as the scale 2. This scale has been magnetized in a direction parallel to the major surface. Nonetheless, the scale shown in FIG. 13 can apply a magnetic field of the same type as the scale 2, to the magnetic sensor 3.

[Embodiment]

A position detecting apparatus according to the invention was made, which has an detection-effective length $L_1$ of 40 mm, an output error of 1% or less, and a y-direction displacement tolerance of ±0.5 mm for the scale 2 and magnetic sensor 3. The scale 2 and the sensor 3 move relative to each other in x direction, the sensor 3 is magnetized in y direction, and the sensor 3 is spaced from the scale 2 in z direction. The x, y and z directions intersect at right angles to one another.

The scale 2 and magnetic sensor 3 of the apparatus were spaced apart by 5 mm from each other. The magnetic sensor 3 was arranged exactly above the axis 2b of the scale 2.

The scale 2 was a magnet made of ferrite-based plastic by injection molding. The material of the scale 2 was made by mixing ferrite and plastic in a ratio of 9:1. The scale 2 was magnetized in a direction perpendicular to the major surface, in the course of the injection molding. The scale 2 had the following magnetic properties. Its residual flux density Br was 0.22 G, and its magnetic coercive force He was 2 kA/m. The major surface 2a of the scale 2 had a width $W_1$ of 4 mm at either end, a width $W_2$ of 2 mm at the middle part, a length $L_1$ of 60 mm, and a thickness of 0.8 mm.

Figure 15:
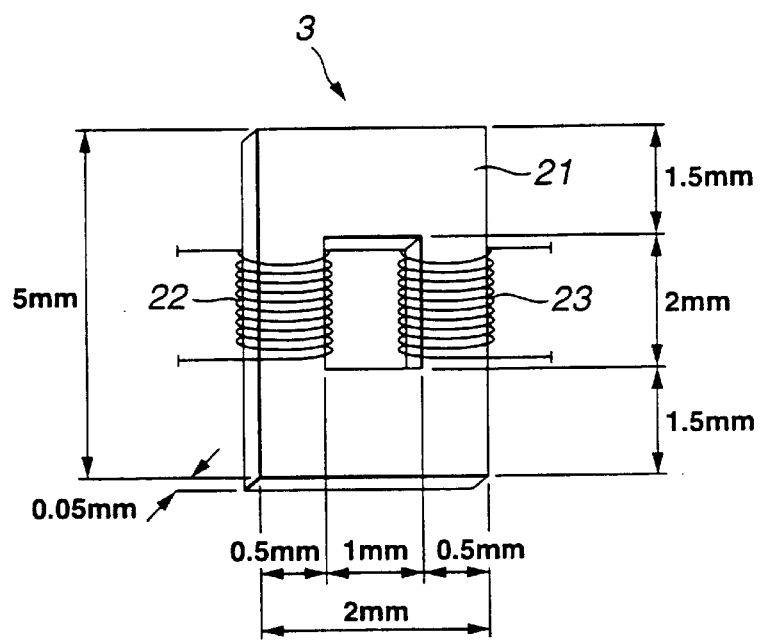
FIG. 15 is a diagram showing the design particulars of the magnetic sensor incorporated in the position detecting apparatus.

The magnetic sensor 3 comprised a core 21. The core 21 was made of permalloy PC and 0.05 mm thick. The core 21 was a rectangular thin plate having a rectangular opening and, thus, defining a closed magnetic path. As is shown in FIG. 15, the core 21 had a length of 5 mm and a width of 2 mm. The rectangular opening was 2 mm long and 1 mm broad. Hence, the longer parts of the core 21 had a width of 0.5 mm broad, and the shorter parts had a width of 1.5 mm. The core 21 was made by etching and heat-treating the unfinished core, thereby mitigating the deterioration of magnetic properties, which resulted from the strain imparted to the unfinished core during the etching.

A copper wire having a diameter of 60 m was wound 50 times around each longer part of the core 21, which had a width of 0.5 mm. Two cylindrical coils 22 and 23 were thereby formed. The core 21 may be manufactured, first by winding coils 22 and 23 around an opened-loop core, and then by securing a core part to the opened-loop core, thereby forming a closed-loop core. In this case, the core 21 can be made easily.

In this actual embodiment, the coils 22 and 23, thus made, were connected to a drive/detection circuit 30 by a signal line having a diameter of 2 mm. The coils 22 and 23 were driven in the opposite phases by a pulse signal that had a frequency of 1 MHz, a duty ratio of 1/10 and a voltage level of 9 V.

The embodiment comprises bridge resistors 37 and 38. Both resistors 37 and 38 exhibited impedance of (R0+ Rmax)/2, where R0 is the impedance the coil 22 and 23 have when no magnetic field is applied to the coils 22 and 23 and the Rmax is the highest impedance the coils 22 and 23 may have.

Figure 16:
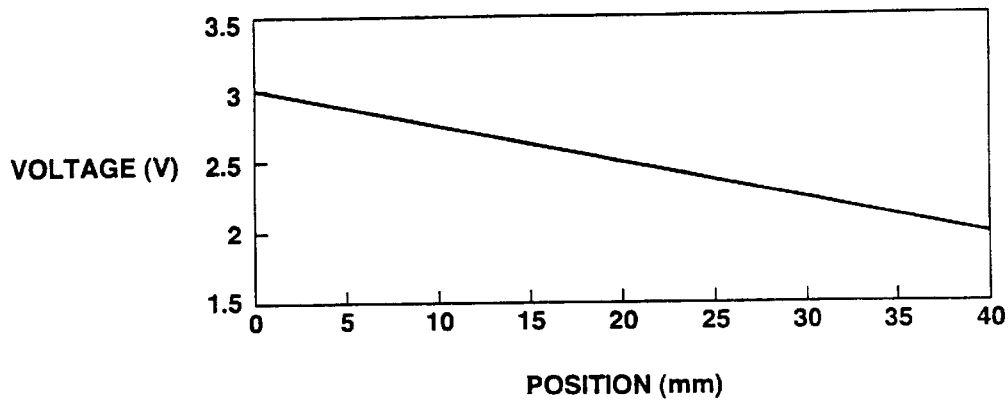
FIG. 16 is a graph representing the output characteristic of the position detecting apparatus.

FIG. 16 shows the output characteristic of the position detecting apparatus 1 actually manufactured. As seen from FIG. 16, this apparatus 1 exhibited a linear output characteristic over the detection-effective length of 40 mm.

Figure 17:
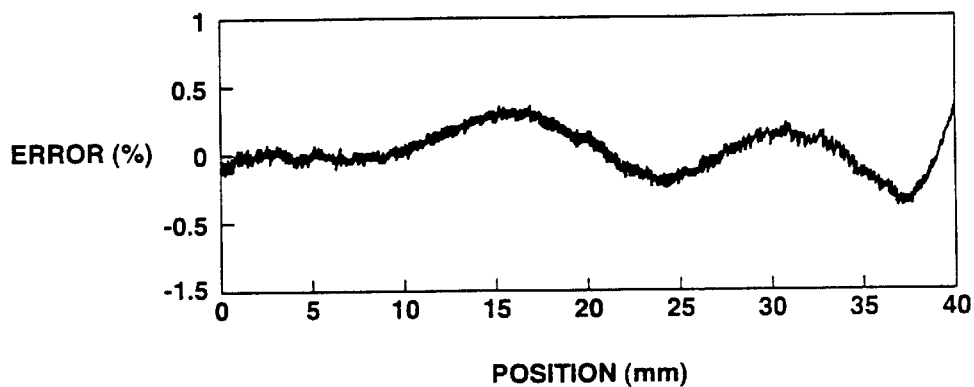
FIG. 17 is a graph showing the output-error characteristic of the position detecting apparatus.

Another position detecting apparatus according to the invention was made. FIG. 17 shows the output-error characteristic of the position detecting apparatus. The apparatus 1 made an output error. However, the output error was only 1% or less as shown in FIG. 17, over the detection-effective length of 40 mm. The apparatus 1 could detect positions with high accuracy.

Figure 18:
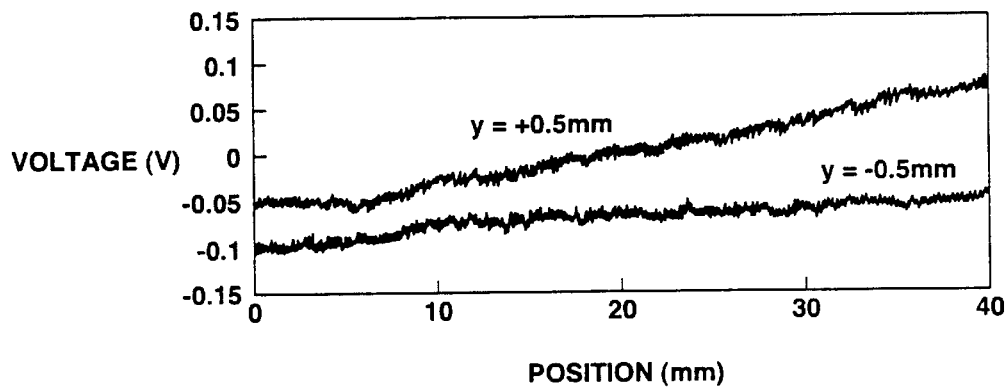
FIG. 18 is a graph representing the output characteristic that the position detecting apparatus exhibits when the scale and the magnetic sensor are displaced from each other, by 0.5 mm in Y direction.

In this position detecting apparatus 1, the scale 2 and magnetic sensor 3 were displaced from each other, for a distance of ±0.5 mm. Even in this case, the apparatus 1 exhibited the output-error characteristic illustrated in FIG. 18. As can be understood from FIG. 18, the output error was extremely small over detection-effective length of 40 mm. In this case, too, the apparatus 1 could detect positions with high accuracy.

What is claimed is:

1. A position detecting apparatus comprising:
   magnetic field generating means for generating a magnetic field;
   magnetic field detecting means capable of moving relative to the magnetic field generating means, for detecting the magnetic field generated by the magnetic field generating means, wherein
      the magnetic field extends in a magnetism-sensing direction perpendicular to a first direction in which the magnetic field detecting means moves relative to the magnetic field generating means and a second direction in which the magnetic field detecting means is spaced from the magnetic field generating means, the magnetic field generating means applies to the magnetic field detecting means a magnetic field whose intensity linearly changes over a prescribed distance (L2) in the direction in which the magnetic field detecting means moves relative to the magnetic field generating means, and a positional relation between the magnetic field generating means and the magnetic field detecting means is detected from the magnetic field detected by the magnetic field detecting means in the magnetism-sensing direction.

2. The position detecting apparatus according to claim 1, wherein the magnetic field generating means applies to the magnetic field detecting means a magnetic field which extends in the magnetism-sensing direction, whose intensity linearly changes over the prescribed distance (L2) and whose polarity alters at a predetermined point existing within the prescribed distance (L2).

3. The position detecting apparatus according to claim 1, wherein the magnetic field generating means comprises first to fourth magnetic members, each having a trapezoidal major surface that has first and second sides which are parallel to each other, a third side which intersects with the first and second sides at right angles and a fourth side which intersects with the first side at an acute angle, said first side having a length $W_{s1}$, said second side having a longer length $W_{s2}$ shorter than the first side, and said third side having a shorter length $L_S$ than or the same length $L_S$ as, half the prescribed distance (L2);

the first magnetic member has a major surface extending parallel to the direction in which the magnetic field detecting means is spaced from the magnetic field generating means, and a third side extending parallel to the direction in which the magnetic field detecting means moves relative to the magnetic field generating means, and generates a magnetic field which extends at right angles to the third side;

the second magnetic member has a major surface extending parallel to the major surface of the first magnetic member, and a third side extending parallel to the third side of the first magnetic member and abutting on the third side thereof, and generates a magnetic field whose polarity is opposite to the magnetic field generated by the first magnetic member;

the third magnetic member has a major surface extending parallel to the major surface of the first magnetic member, a second side extending parallel to and spaced from the second side of the first magnetic member and a third side aligned with the second side of the first magnetic member, and generates a magnetic field whose polarity is opposite to the magnetic field generated by the first magnetic member; and the fourth magnetic member has a major surface extending parallel to the major surface of the first magnetic member, a second side extending parallel to and spaced from the second side of the second magnetic member and a third side aligned with the third side of the second magnetic member, and generates a magnetic field whose polarity is opposite to the magnetic field generated by the second magnetic member.

4. The position detecting apparatus according to claim 1, wherein the magnetic field detecting means comprises a core made of high-perineability material and coils wound around the core, and the coils are excited in the magnetism-sensing direction when a high-frequency current flows through the coils.

* * * * *